(12) United States Patent
Kimura et al.

(10) Patent No.: US 7,116,309 B1
(45) Date of Patent: Oct. 3, 2006

(54) PHOTOWRITING DISPLAY DEVICE AND PHOTOWRITING DISPLAY UNIT INCORPORATING THE SAME

(75) Inventors: Koichi Kimura, Shizuoka (JP); Mitsuru Sawano, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/544,567

(22) Filed: Apr. 6, 2000

(30) Foreign Application Priority Data

Apr. 7, 1999 (JP) .................................. 11-100499

(51) Int. Cl.
G09G 3/38 (2006.01)

(52) U.S. Cl. .......................... 345/105; 345/49; 345/72; 345/83

(58) Field of Classification Search ................ 345/173, 345/175, 176, 183, 87, 88, 105, 4, 5, 6, 49, 345/72, 83
See application file for complete search history.

(56) References Cited

U.S. PATENT DOCUMENTS

| | | | | |
|---|---|---|---|---|
| 3,645,604 A * | 2/1972 | Ngo | .............................. | 349/77 |
| 4,599,614 A * | 7/1986 | DeBerry et al. | ............. | 350/357 |
| 4,743,972 A * | 5/1988 | Makihara | .................... | 358/482 |
| 4,911,536 A * | 3/1990 | Ditzik | ........................ | 350/351 |
| 5,148,306 A * | 9/1992 | Yamada et al. | ............. | 359/271 |
| 5,157,540 A * | 10/1992 | Kidai et al. | .................. | 359/273 |
| 5,162,782 A * | 11/1992 | Yoshioka | ..................... | 340/712 |
| 5,473,340 A * | 12/1995 | Soltan et al. | ............... | 345/105 |
| 5,568,292 A * | 10/1996 | Kim | ............................. | 359/67 |
| 5,625,474 A * | 4/1997 | Aomori et al. | ............... | 349/79 |
| 5,790,215 A * | 8/1998 | Sugahara et al. | ............. | 349/74 |
| 5,796,447 A * | 8/1998 | Okumura et al. | ............ | 349/33 |
| 5,896,575 A * | 4/1999 | Higginbotham et al. | ..... | 455/566 |
| 5,995,172 A * | 11/1999 | Ikeda et al. | .................. | 349/12 |
| 6,232,938 B1 * | 5/2001 | Tsuchida et al. | ............. | 345/88 |
| 6,252,638 B1 * | 6/2001 | Johnson et al. | ............... | 349/5 |

* cited by examiner

*Primary Examiner*—Sumati Lefkowitz
*Assistant Examiner*—Alecia D. Nelson
(74) *Attorney, Agent, or Firm*—Sughrue Mion, PLLC

(57) ABSTRACT

A photowriting display device which is capable of performing bright full color display and a photowriting display apparatus which incorporates the photowriting display device and on which the pen moving operation is directly reflected as information to be displayed. A photowriting display device is disclosed which incorporates: an electrochromic display member incorporating a photoconductor in which only regions irradiated with writing light generate carriers to realize conductivity; an electrochromic layer in which light absorption of the regions are reversibly changed owing to electrochemical oxidation and reduction reactions caused to occur due to the conductivity; an electrolyte in which the electrochromic layers are laminated or an electrochromic material is dissolved; and a pair of electrodes laminated through the photoconductor, the electrochromic layer and the electrolyte. A plurality of the electrochromic display members are laminated.

12 Claims, 10 Drawing Sheets

EC MATERIAL

V1 – Off, V2 – Off, V3 – Off : VOLTAGES FOR CAUSING COLOR ERASING REACTION

PHOTOWRITING DISPLAY DEVICE AND PHOTOWRITING DISPLAY UNIT INCORPORATING THE SAME

FIELD OF THE INVENTION

The present invention relates to a photowriting display device for writing information and displaying information owing to color development by using an electrochromic material, the light absorption of which is reversibly changed owing to electrochemical oxidation and reduction reactions and a photowriting display unit incorporating the same.

DESCRIPTION OF THE RELATED ART

In recent years, paper-like or print like display units have been required. The foregoing display unit is able to reversibly erasing displayed contents with non-luminous display quality similar to that of printed matter. In particular, it is preferable that the image is formed owing to diffusion reflection (or transmission) which exhibits excellent visibility and, therefore, the image having high contrast is displayed in full colors. To obtain a display unit of the foregoing type, a reflecting-type LCD has been researched and developed. The reflecting-type LCD having dependency on an angle of visibility suffers from unsatisfactory visibility. Moreover, color filters disposed in a plane or a method using a polarizing plate cannot realize satisfactory brightness.

As a means, the light absorption of which is reversibly changed owing to electrochemical oxidation and reduction reactions, an electrochromic device (an EC device) using an electrochromic material (an EC material) can be available. The EC device has a structure that a thin film made of the EC material and an electrolyte are laminated between transparent electrodes. As an alternative to this, the EC device has a structure that an EC material is dissolved in an electrolyte. When voltage is, through the transparent electrodes, applied to the laminated thin film made of the EC material and the electrolyte, electrochemical oxidation and reduction reactions take place so that reversible color developing reactions or color erasing reactions (color developing/erasing reactions) occur on the overall surface of the thin film made of the EC material.

The EC device, which is the light-absorption-type device, emits diffused light without any dependency on the angle of visibility. Therefore, the EC device exhibits excellent visibility. Moreover, the EC device has a memory characteristic and requires only a low operating voltage. As a result, the EC devices have been employed in a portion of display units.

The above-mentioned conventional EC device having a single-layer structure cannot form a multicolor image and a full color image. On the other hand, an EC material (rare earth metal: lutetium) which develops different colors as follows to correspond to the applied voltage:

-1.5V to -1.0V to -0.5V to +0.5V to +1.0V to +1.5V
Red      Blue      Green   (Reddish)    Red
                           (Brown)

Moreover, an EC device incorporating RGB (or YMC) color filters disposed on a plane has been known. However, bright full color display cannot be realized.

A photowriting display device apparatus incorporating a conventional EC device cannot perform direct display by a writing operation using a pen or the like or extract written image information into a computer or the like.

SUMMARY OF THE INVENTION

In view of the foregoing, an object of the present invention is to provide a photowriting display device which is capable of performing bright full color display and a photowriting display apparatus which incorporates the photowriting display device on which a writing operation using a pen or the like is directly reflected on displayed information.

To achieve the foregoing object, according to a first aspect of the present invention, there is provided a photowriting display device comprising: an electrochromic member incorporating a photoconductor in which only regions irradiated with writing light generate carriers to create conductivity; an electrochromic layer in which light absorption at said regions are reversibly changed owing to electrochemical oxidation and reduction reactions caused to occur due to the conductivity; an electrolyte in which said electrochromic layers are laminated or an electrochromic material is dissolved; and a pair of electrodes laminating said photoconductor, said electrochromic layer and said electrolyte in-between.

The photowriting display device according to the present invention is structured such that when voltage is applied to a space between the pair of the electrodes and writing light is applied, carries are generated in only the regions of the photoconductor irradiated with writing light so that conductivity is realized. The realized conductivity causes the electrochromic layer applied with the voltage to be changed owing to oxidation and reduction reactions. As a result, specific portions of the electrochromic layer perform color developing/erasing reactions in accordance with image information so that an image is displayed.

According a second aspect, there is provided a photowriting display device, having a plurality of electrochromic display members which are developed into different colors.

The photowriting display device incorporates the electrochromic display members developing different colors and laminated so to be capable of realizing multicolor or full color display which has been difficult for the conventional electrochromic display member having a single-layer structure.

According to a third aspect of the present invention, there is provided a photowriting display device, wherein a separator for preventing diffusion of the carrier and/or the oxidation and reduction reactions in a direction in parallel with the surface of laminate is provided for at least any one of the photoconductor, the electrochromic layer and the electrolyte.

The foregoing photowriting display device has the structure that the diffusion of the carrier and/or the oxidation and reduction reactions to regions except for the regions irradiated with writing light is prevented by the separator. Therefore, the boundary of an image can clearly be displayed.

According to a fourth aspect, there is provided a photowriting display device, wherein the electrochromic display members in corresponding layers have different photosensitive wavelengths for writing, and writing on the electrochromic display member in an arbitrary layer is performed by selectively making incident writing light beams having the plural wavelengths.

Since the foregoing photowriting display device has the structure that the electrochromic display members have different photosensitive wavelengths for writing, incident of writing light having a specific wavelength causes writing to be performed on the electrochromic display member in a specific layer.

According a fifth aspect, there is provided a photowriting display device having a structure that the electrochromic display member in each layer is selectively applied with voltage or an electric current and simultaneously irradiated with writing light so that writing on the electrochromic display member in an arbitrary layer is performed.

The photowriting display device has the structure that when the voltage or the electric current for causing an electrochromic display member in a color attempted to be written to perform a color developing reaction simultaneously with incident of writing light having one type of wavelength, writing on the electrochromic display member on the layer can be performed.

According to a sixth aspect, there is provided a photowriting display device having a structure that the electrochromic display member is changed between transparent and color states with respect to a visible-ray region.

The photowriting display device is able to directly form an image displayed on the electrochromic display member written owing to the color development reaction into a visible image. Moreover, the electrochromic display members which are developed into arbitrary colors can be laminated. As a result, bright multicolor display can easily be realized.

According to a seventh aspect, there is provided a photowriting display device having a structure that the wavelength of writing light is deviated from a visible ray region.

The foregoing photowriting display device has the structure that writing on an electrochromic display member in a specific layer is performed when writing light having a wavelength deviated from the visible ray region has been made incident. Thus, absorption of writing light into the electrochromic display member colored in the visible ray region can be prevented. Therefore, control of writing of display in an arbitrary color in the visible ray region is permitted.

According to an eighth aspect, there is provided a photowriting display device comprising: an electrochromic display member which is changed between a transparent state in a visible ray region and a yellow state, an electrochromic display member which is changed between a transparent state in a visible ray region and a magenta state and an electrochromic display member which is changed between a transparent state in a visible ray region and a cyan state, wherein the electrochromic display members are laminated.

The foregoing photowriting display device enables each of the laminated electrochromic display members to develop yellow, magenta and cyan which are three primary colors so that full color display is permitted.

According to ninth aspect, there is provided a photowriting display apparatus incorporating a photowriting display device according to any one of first to eighth aspects, the photowriting display apparatus comprising: a writing display plate provided with the photowriting display device; and a writing head which incorporates a plurality of light emitting portions arranged to emit writing light and disposed in the form of a line opposite to the writing display plate and which is moved in parallel with the writing display plate in a direction perpendicular to a direction of disposition of the plural light emitting portions.

The foregoing photowriting display device has a structure that the light emitting portions of the writing head disposed in the form of the line emit light in accordance with image information. Moreover, the writing head is moved in parallel with the writing display plate. As a result, the writing display plate can be scanned with writing light. In accordance with writing light, the writing display plate develops/erases color so that an image is displayed.

According to a tenth aspect of the present invention, there is provided a photowriting display apparatus incorporating a photowriting display device according to any one of first to ninth aspects, the photowriting display apparatus comprising: a writing display plate provided with the photowriting display device; and a pen incorporating a light emitting portion arranged to emit writing light and disposed at a leading end thereof.

The photowriting display device incorporates the writing display plate which is irradiated with writing light by the pen having the light emitting portion disposed at the leading end thereof. In accordance with writing light, the writing display plate develops/erases color so that an image is displayed. As a result, a writing operation using the pen can directly be reflected as information which must be displayed.

According to an eleventh aspect of the present invention, there is provided a photowriting display device incorporating a photowriting display device according to the second aspect and having a structure according to the ninth aspect, wherein the electrochromic display member which develops different color are shifted in a direction of the surface of lamination to expose each of the electrode of each of the electrochromic display member at an end of the writing display plate, and a sliding contact arranged to electrically be made contact with the exposed electrode is provided for the writing head.

The foregoing photowriting display device has the structure that the electrochromic display members which develop different colors are shifted in the direction of lamination. Moreover, each electrode of each of the electrochromic display members is exposed at the end of the writing display plate. As a result, a large area of each of the laminated electrodes of the plural electrochromic display members can be exposed. Therefore, the reliability of the electric connection between the writing head and the electrochromic display member can be improved.

Other objects, features and advantages of the invention will be evident from the following detailed description of the preferred embodiments described in conjunction with the attached drawings.

DESCRIPTION OF THE PREFERRED EMBODIMENT

Embodiments of a photowriting display device and a photowriting display apparatus according to the present invention will now be described with reference to the drawings.

Figure 1:
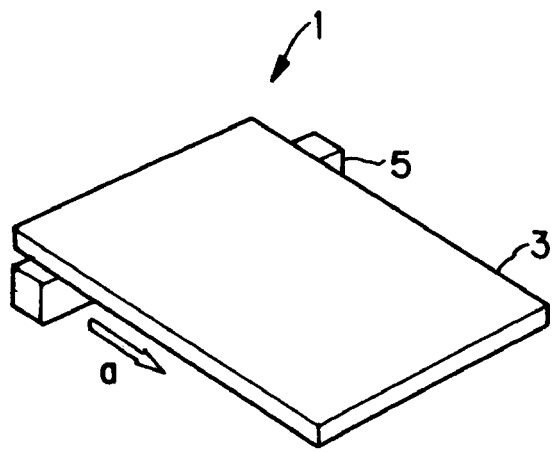
FIG. 1 is a schematic view showing a photowriting display apparatus according to a first embodiment of the present invention.
Figure 2:
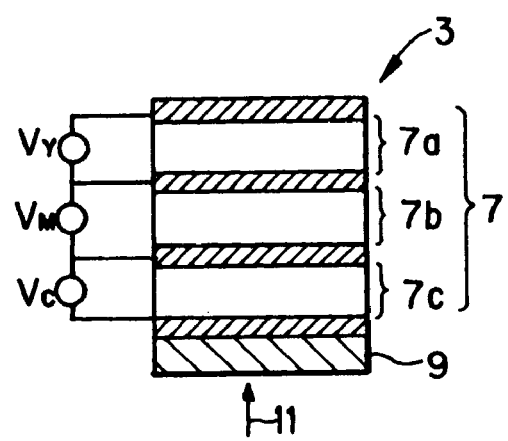
FIG. 2 is a cross sectional view showing photowriting display devices formed into a laminate.

FIG. 1 is a schematic view showing the photowriting display apparatus according to a first embodiment of the present invention. As shown in FIG. 1, a photowriting display apparatus 1 according to this embodiment incorporates a writing display plate 3 and a writing head 5. As shown in FIG. 2, the writing display plate 3 incorporates photowriting display devices 7 which, develop different colors.

The photowriting display devices 7 according to this embodiment are structured by laminating three types of electrochromic display members (EC display members) 7a, 7b and 7c. The EC display members 7a, 7b and 7c develop three primary colors which are yellow (Y), magenta (M) and cyan (C). The structure according to this embodiment is formed to display a bright full color image. The photowriting display device according to the present invention may incorporate the EC display members formed into a state except for the three-layer structure. Moreover, EC display members may be employed which develop arbitrary colors except for YMC.

A reflecting film 9 is disposed on either surface (the lower surface shown in FIG. 1) of the writing display plate 3. The reflecting film 9 is transparent with respect to writing light 11, while the reflecting film 9 is able to reflect light having a wavelength except for the wavelength of writing light 11. Writing light 11 may be, for example, an infrared ray (IR) or an ultraviolet ray (UV). The reflecting film 9 may be an interference filter in the form of a multilayer film or a half mirror. When the writing display plate 3 is displayed with transmitted light, the reflecting film 9 may be omitted from the structure.

The structure of the EC display member will now be described.

Figure 3:
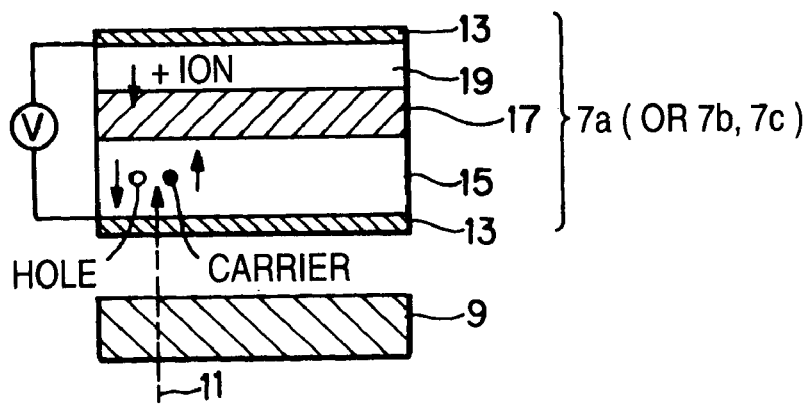
FIG. 3 is a cross sectional view showing a single color developing layer of the photowriting display device.

As shown in FIG. 3, each of EC display members 7a, 7b laminated into a layer for each color incorporates an EC layer 17, an electrolyte layer 19 formed on the EC layer 17 and a pair of electrodes 13 sandwiching the EC layer 17 and the electrolyte layer 19. In this embodiment, the lower electrode 13 is transparent with respect to writing light 11 and the upper electrode 13 is transparent with respect to emitted light.

The photoconductor layer 15 is a layer for generating and conducting electrons and holes such that carriers in only a region irradiated with writing light 11 are moved. Therefore, carriers in only the region irradiated with writing light 11 are generated so that conductivity is realized. As a result, supply or receipt of electrons is performed in only the region of the EC layer 17 corresponding to the foregoing region of the photoconductor layer 15.

Figure 4:
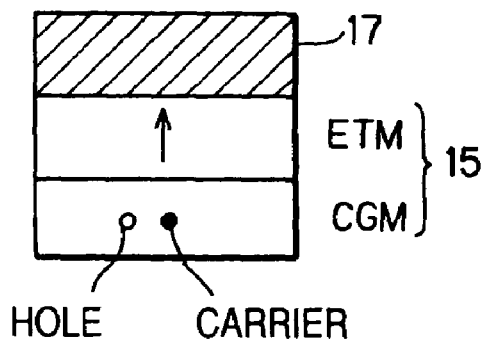
FIG. 4 is a cross sectional view showing an example of the photoconductive layer.

The photoconductor layer 15 is made of an inorganic semiconductor or an organic semiconductor and an organic conductor. In the latter case, the photoconductor layer 15 may be structured by laminating a CGM (Carrier Generation Material) layer for generating the carriers and an ETM (Electron Transfer Material) layer for moving the generated carriers, as shown in FIG. 4. In the foregoing case, the ETM layer efficiently moves the carriers. In the structure shown in FIG. 4, the photoconductor layer 15 may be structured by laminating HTM (hole transfer material) as a substitute for the ETM layer.

The EC display member 7a (or 7b or 7c) may variously be structured.

Figure 5A:
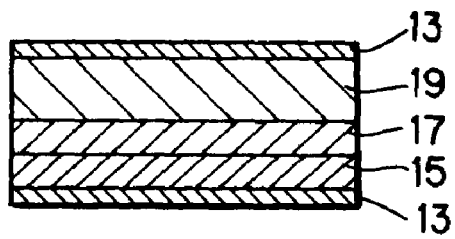
FIG. 5(*a*) and FIG. 5(*b*) are cross sectional views showing the EC display members having the example structures in which the position of the photoconductors are shifted.
Figure 5B:
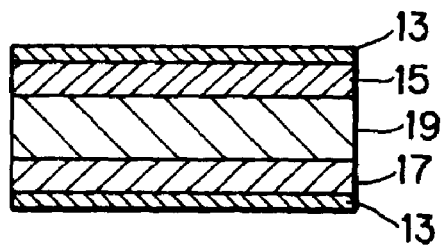

As for the position of the photoconductor layer 15, a structure as shown in FIG. 5 (A) may be employed in which the electrodes 13/the photoconductor layer 15/the EC layer 17/the electrolyte layer 19/the electrodes 13 are laminated in an upward direction. Another structure shown in FIG. 5 (b) may be employed in which the electrodes 13/the EC layer 17/the electrolyte layer 19/the photoconductor layer 15/the electrodes 13 are laminated in the upward direction.

Figure 6A:
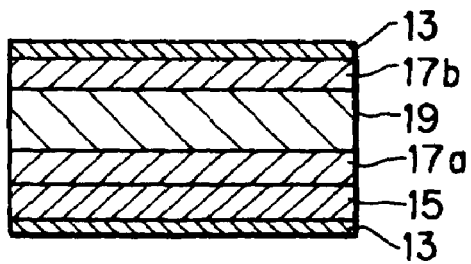
FIG. 6(*a*) and FIG. 6(*b*) are cross sectional views showing the EC display members having a plurality of EC layers.
Figure 6B:
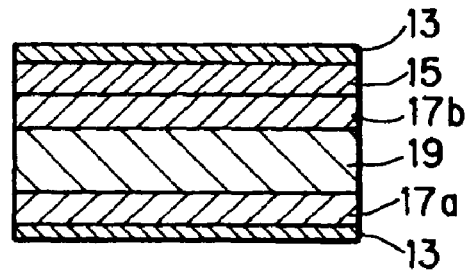

A plurality of the EC layers 17 may be provided. In the foregoing case, a laminate structure as shown in FIG. 6 (a) may be employed in which the electrodes 13/the photoconductor layer 15/a first EC layer 17a/the electrolyte layer 19/a second EC layer 17b/the electrodes 13 are laminated in the upward direction. A structure as shown in FIG. 6 (b) may be employed in which the electrodes 13/the first EC layer 17a/the electrolyte layer 19/the second EC layer 17b/the photoconductor layer 15/the electrodes 13 are laminated in the upward direction.

It is preferable that the EC layers 17a and 17b are structured such that either layer (for example, the first EC layer 17a) is an EC layer for developing color by using oxidation and the other layer (for example, the second EC layer 17b) is an EC layer for developing color by using reduction.

Figure 7:
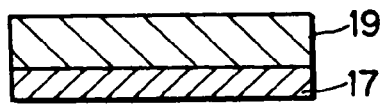
FIG. 7(*a*) and FIG. 7(*b*) are cross sectional views showing examples of the structures of the EC layer and an electrolyte.
Figure 7:
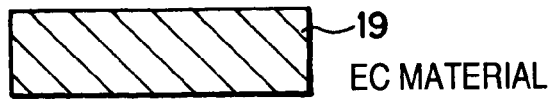

The structures of the EC layer 17 and the electrolyte layer 19 may be formed as shown in FIG. 7 (a) in which the EC layer 17 and the electrolyte layer 19 are laminated. A structure as shown in FIG. 7 (b) may be employed in which an EC material is dissolved in the electrolyte layer 19.

The EC material will now be described.

An inorganic EC material is exemplified by WO3, MoO3, V2O5, NiOOH, CoOOH and IrO2.

An organic EC material is exemplified by:

a. low molecular weight materials including viologen derivative, carbazole derivative, a styryl compound and a metal complex (phthalocyanine, phenanthroline, Prussian blue or bipyridine complex).

b. polymer having any one of the foregoing low molecular weight material introduced into the main chain or the side chain thereof.

c. conductive polymer, such as polypyrrole, polythiophene or polyaniline [oxidation (blue to purple)⇌ reduction (colorless).

The foregoing organic polymer EC materials shown in a, b and c can be prepared by electropolymerizing method or a chemical polymerizing method using an oxidizer. The above-mentioned organic polymer EC materials are stable materials as compared with low molecular weight materials and suitable to be used in the laminated device according to the present invention.

It is more preferable that the viologen derivative, aniline derivative, the styryl compound or their polymers are employed because each of the foregoing materials is able to perform colorless and color developing operations corresponding to the colors. Thus, the foregoing materials are suitable to perform multicolor or full color developing operations according to the present invention.

It is preferable that the electrolyte has a high ion conductivity and a low electron conductivity. The electrolyte may be any one of the following liquid electrolyte or solid electrolyte: the liquid electrolyte is exemplified by: solution prepared by dissolving alkali metal salt, such as LiBF4 (lithium borate tetrafluoride), NaBF4 (sodium borate tetrafluoride), LiClO4 (lithium perchlorate) or KSCN (potassium thiocyanate) in organic solvent, such as acetonitrile, dimethylformamide or propylene carbonate. As an alternative to this, the liquid electrolyte may be acid solution of, for example, H3PO4 (phosphoric acid), HCL (hydrochloric acid) or H2SO4 (sulfuric acid).

When the liquid electrolyte is employed, the laminate structure according to the present invention is required to prevent leakage of the solution to another display layer and outward leakage. The foregoing preventive structure can be constituted by, through a spacer for compensating the thickness of the electrolyte, bonding a conductive film made of resin or glass and serving as the electrodes 13 to the upper surface of a thin film having the electrodes 13 and the photoconductor layer 15 formed thereon. Then, a liquid electrolyte is introduced to seal the periphery of the structure. The process is repeated for each of the EC display members 7a, 7b and 7c.

When the EC material is the dissoluble material, the EC material is previously dissolved in the liquid electrolyte. When the EC material is the solid material, the EC material is previously formed on the photoconductor layer 15.

It is preferable that the electrolyte is a solid electrolyte.

The solid electrolyte may be a material prepared by dissolving the foregoing alkali metal salt or acid in PEO (polyethylene oxide), PPO (polypropylene oxide) or PVA (polyvinyl alcohol).

When the solid polymer electrolyte is employed, the multilayer device according to this embodiment can sequentially be formed in an upward direction. Moreover, the problem of the leakage of the solution can be prevented. In addition, the overall body of the device can be made to be flexible.

The photoconductor layer 15 may be made of an inorganic material or an organic material.

The inorganic photoconductive member may be made of any one of a variety of inorganic semiconductors or inorganic insulating oxide films. It is preferable that ZnS, ZnO, CdSe, AsSe, TiO2, GaN or SiC which has a photoconductive characteristic with respect to an ultraviolet ray is employed.

In a case of organic photoconductor, the CGM is polyvinyl carbazole which has a photoconductor characteristic with respect to an ultraviolet ray. It is preferable that titanylphthalocyanine, squalilium pigment or azo pigment having a photoconductive characteristic in an infrared ray region is employed. It is preferable that the ETM is diphenoquene derivative and the HTM is hydrazone derivative.

The transparent electrodes 13 may be made of an oxide, such as SnO2, In2O3 or ITO or constituted by a semitransmissive thin metal film made of Pt or Au or a transparent conductive film manufactured by dispersing the foregoing oxide or metal particles in a resin or glass. It is preferable that SnO2 exhibiting excellent chemical stability is employed. Note that SnO2 can be prepared by vacuum evaporation, sputtering, CVD or a sol-gel method.

The principle of the EC layer 17 for developing/erasing color will now be described.

The color developing/erasing reactions of the EC layer 17 containing viologen is performed when voltage is applied to the EC layer 17. When R has a length which is similar to that of a heptyl group, radical cation is made dissoluble in water. Thus, the radical cation adheres to the surface of the cathode so that a state of display is memorized. In the foregoing system, change of a portion of the structure of the viologen enables the color to be varied to reddish purple, red, blue and green. In this embodiment, each EC layer 17 develops a single color.

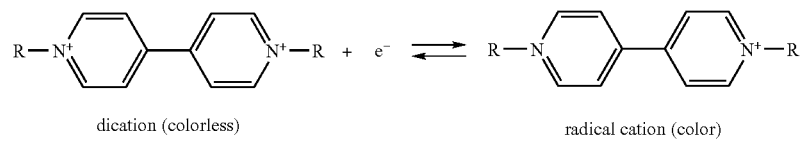

dication (colorless)    radical cation (color)

If the memory state of the EC layer 17 containing viologen is maintained for a long time, crystallization of the radical cation and liberation from the electrode take place. Thus, color cannot easily be erased. The foregoing problem can be overcome by forming a polymer film, in which the EC material is bonded, on the electrode. Thus, the lifetime can furthermore be elongated. As a structure similar to the polymer type EC material, diphthalocyanine which is a rare earth element may be employed.

The oxidation and reduction reactions using WO3 (tungsten oxide) which is an inorganic EC material take place as expressed by the following formula. Note that M+ is exemplified by H+, Li+, Na+ and Ag+.

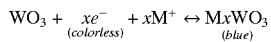

Electrolytic corrosion of tungsten oxide can be prevented by using non-aqueous solvent, such as acetonitrile, dimethylformamide or propylene carbonate, as the electrolytic solution and LiCi4 or the like as the electrolytic solution.

An example of writing and display of the photowriting display device using light beams having three wavelengths will now be described.

Figure 8:
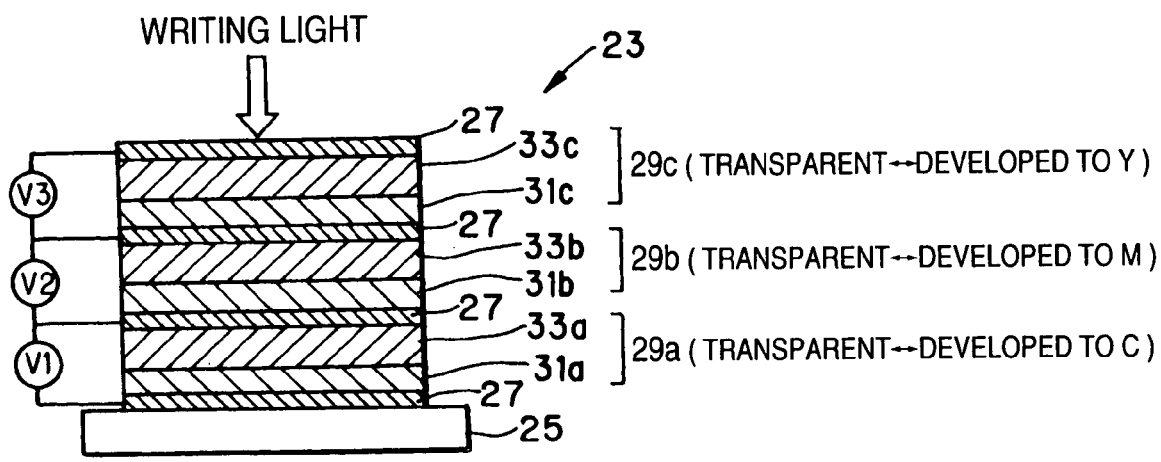
FIG. 8 is a cross sectional view showing the display device with which an example of writing display is realized with three wavelengths of writing light.

The structure of a photowriting display device for use to describe the foregoing operation is shown in FIG. 8. As shown in FIG. 8, the photowriting display device 23 according to this example has a substrate 25 on which the following elements are sequentially laminated: an electrode 27/a first EC display layer 29a/an electrode 27/a second EC display layer 29b/an electrode 27/a third display layer 29c/an electrode 27.

The first EC display layer 29a is constituted by laminating a first photoconductor member 31a and a first EC electrolyte layer 33a. The second EC display layer 29b is constituted by laminating a second photoconductor member 31b and a second EC electrolyte layer 33b. The third display layer 29c is constituted by laminating a third photoconductor member 31c and a third EC electrolyte layer 33c. The color development of the first EC electrolyte layer 33a is performed from transparent to C, that of second EC electrolyte layer 33b is performed from transparent to M and that of third EC electrolyte layer 33c is performed from transparent to Y (the foregoing color development is reversible). Each of the photoconductors, electrolytes and electrodes is transparent with respect to visible light, while each of the EC electrolyte layers and electrodes is transparent with respect to writing light.

Figure 9:
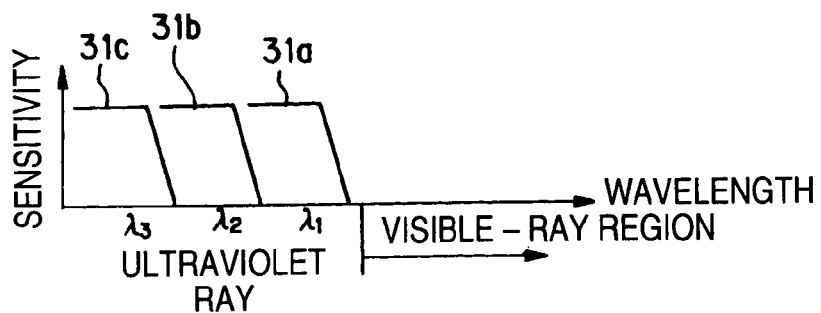
FIG. 9 is a graph showing spectral sensitivity of each photoconductor shown in FIG. 8.

As shown in FIG. 9, the spectral sensitivity of each photoconductor is arranged such that the first photoconductor member 31a corresponds to ultraviolet ray region λ1, the second photoconductor member 31b corresponds to ultraviolet ray region λ2 and the third photoconductor member 31c corresponds to ultraviolet ray region λ3.

Figures 10A, 10B:
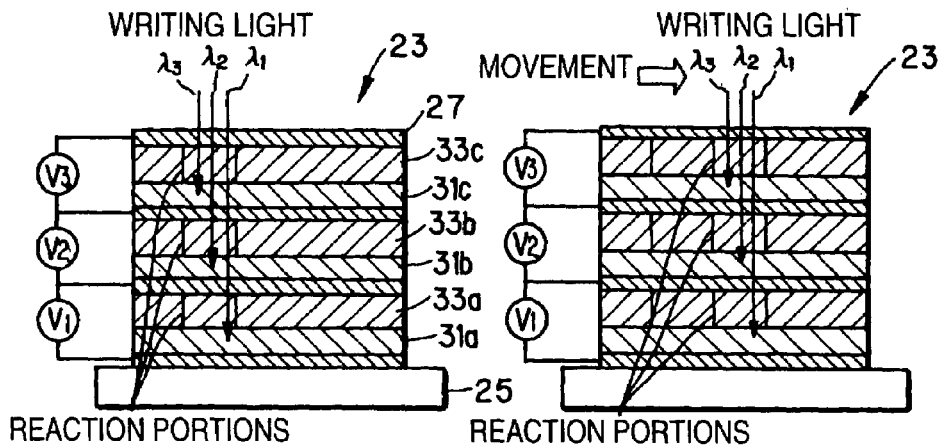
FIG. 10(a) and FIG. 10(b) are diagrams showing writing states of the display device shown in FIG. 8.

As shown in FIG. 10 (a), the photowriting display device 23 structured as described above uses three types of writing light having wavelengths λ1, λ2 and λ3 to write images on the corresponding EC display layers 29a, 29b and 29c.

Writing light having the wavelength of λ3 is absorbed by the third photoconductor member 31c to generate light carriers in accordance with the intensity of light. When voltage for performing color development is applied to a power source V3, the third EC electrolyte layer 33c is developed to Y (yellow) to correspond to the intensity of light.

Writing light having the wavelength of λ2 is absorbed by the second photoconductor member 31b to generate light carriers in accordance with the intensity of light. When voltage for performing color development is applied to a power source V2, the second EC electrolyte layer 33b is developed to M (magenta) to correspond to the intensity of light.

Writing light having the wavelength of λ1 is absorbed by the first photoconductor member 31a to generate light carriers in accordance with the intensity of light. When voltage for performing color development is applied to a power source V1, the first EC electrolyte layer 33a is developed to C (cyan) to correspond to the intensity of light.

When writing light is spatially shifted, that is, when writing on another space (the position) is performed, writing light is moved in parallel with the substrate 25, as shown in FIG. 10 (b). Thus, writing is performed similarly to the process shown in FIG. 10 (a). Since the previously written portion is not irradiated with writing light, the photoconductor becomes non-conductive. Therefore, the oxidation and reduction reactions do not occur in the EC electrolyte layer corresponding to the foregoing portion. Thus, the color state realized by previous writing is maintained (memorized).

When erasing is performed, a required portion is irradiated with writing light corresponding to the EC display layer. Then, voltage for erasing color (realizing transparent) is applied to the power source connected to the foregoing layer.

When voltage for causing an oxidation (reduction) reaction to occur has been applied when color development is performed, voltage for causing a reduction (oxidation) reaction to occur is applied when the color is erased.

Any one of a variety of writing/erasing sequences may be employed. For example, a process may be employed in which the color state is erased from the overall surface of the device, followed by performing writing on an arbitrary space (position). Another process may be employed in which erasing is performed at an arbitrary space (position), followed by performing writing.

In the example case of the writing display operation using writing light having three wavelengths, the image forming means has the structure that the density of color is controlled to correspond to the intensity of light. As an alternative to this, a method may be employed with which light having a predetermined intensity is applied to control the density of the color to correspond to the duration of light application. The density of the color may be controlled in accordance with the power supply voltage. Moreover, the foregoing methods may be combined with one another to control the density of the color.

The wavelength for developing color, the writing wavelength and the number of the EC display layers are not limited to the foregoing writing display example, that is, they may be determined arbitrarily. The structure of the EC display layer is not limited to the foregoing example. For example, the order of lamination may be such that the EC electrolyte layer/the photoconductor from a direction of incidence of light. An order that the photoconductor/the EC electrolyte layer may be employed.

The foregoing writing display example is structured to perform display owing to light transmission. A reflection display method may be employed such that a reflecting layer is provided for either of the devices. Also the direction in which the writing light is applied may arbitrarily be determined. The photowriting display device may incorporate optical filters in the optical path thereof.

In an example case of an EC display member structured such that the surface of the substrate is irradiated with writing light and the opposite surface of the substrate is made to be the display surface, it is preferable that an optical filter is provided for a position adjacent to the display surface when writing light is UV or IR. The foregoing optical filter is transparent with respect to a visible ray and the filter intercept UV or IR. As a result, an error in the writing operation owing to disturbance UV ray or IR ray can be prevented. Moreover, unnecessary emission of writing light toward the display surface can be prevented.

An example of writing display using writing light and application of voltage will now be described.

Figure 11:
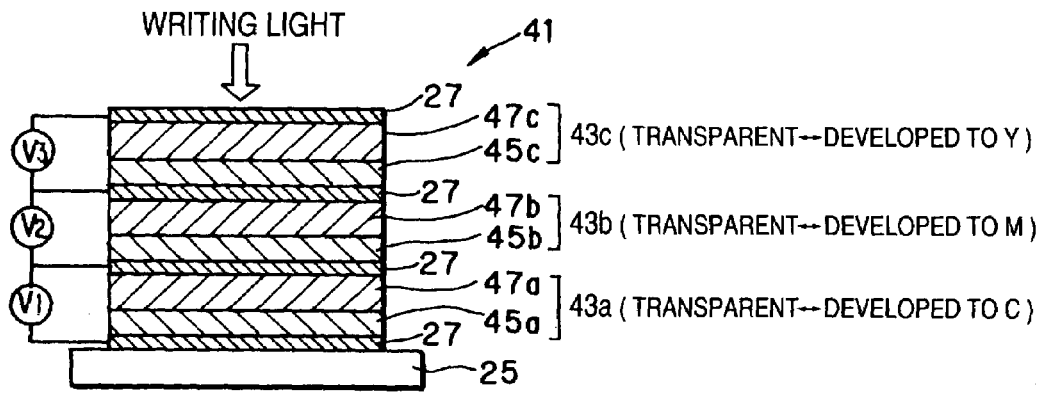
FIG. 11 is a cross sectional view showing a display device in a state in which writing light and application of voltage are used to display written information.

The structure of a photowriting display device 41 for use in the description of the foregoing operation is shown in FIG. 11. As shown in FIG. 11, the photowriting display device 41 incorporates a substrate 25, on which the following elements are sequentially laminated: an electrode 27/a first EC display layer 43a/an electrode 27/a second EC display layer 43b/an electrode 27/a third display layer 43c/ an electrode 27.

The first EC display layer 43a is constituted by laminating a first photoconductor member 45a and a first EC electrolyte layer 47a. The second EC display layer 43b is constituted by a second photoconductor member 45b and a second EC electrolyte layer 47b. The third display layer 43c is constituted by laminating a third photoconductor member 45c and a third EC electrolyte layer 47c. The color development of the first EC electrolyte layer 47a is performed from transparent to C, that of the second EC electrolyte layer 47b is performed from transparent to M and that of the third EC electrolyte layer 47c is performed from transparent to Y (the foregoing color development is reversible). Each of the photoconductors, electrolytes and electrodes are transparent with respect to a visible ray, while each of the EC electrolyte layers and electrodes are transparent with respect to writing light.

As for the spectral sensitivity of the photoconductors, it is preferable that the photoconductor members 45a, 45b and 45c are made of the same material. That is, photoconductors of a type which generates photo-carriers are employed when wavelength λ of one type of writing light source is made incident on each of the photoconductors. It is preferable that the wavelength λ is a wavelength deviated from the visible ray region. It is preferable that an ultraviolet ray or an infrared ray is employed.

If the photoconductor generates photo-carriers with respect to the wavelength λ, the photoconductors in the layers may be made of different materials.

Each of the photoconductors, the electrolytes and the electrodes are transparent with respect to a visible ray, while each of the EC electrolyte layers and electrodes are transparent with respect to writing light.

It is preferable that the material and the thickness of each photoconductor are adjusted in such a manner that light is substantially uniformly absorbed by the photoconductor in each layer when writing light is applied from one direction.

When writing is performed, writing light having the wavelength λ is used so that an image is written on the EC display layers 43a, 43b and 43c. When writing light is applied, writing light is absorbed by the photoconductor in each layer as described above. Thus, photo-carriers are generated.

To select the EC display layer in the required color, the voltage of the power source connected to each EC display layer is controlled.

As shown in FIG. 13 (a), writing on the third display layer 43c is performed by opening the power source lines of V2 and V1. Then, voltage for developing color is applied to V3 so that writing light is applied. In accordance with the intensity of light, the third EC electrolyte layer 47c develops Y (yellow). Since the first and second EC display layers 43a and 43b are opened circuit at this time, the color states are maintained.

As shown in FIG. 13 (c), writing on the second EC display layer 43b is performed by opening the power source lines of V3 and V1. Then, voltage for developing color is applied to V2 so that writing light is applied. In accordance with the intensity of light, the second EC electrolyte layer 47b develops M (magenta). Since the first and third EC display layers 43a and 43c are opened circuit at this time, the color states are maintained.

As shown in FIG. 13 (e), writing on the first EC display layer 43a is performed by opening the power source lines of V2 and V3. Then, voltage for developing color is applied to V1 so that writing light is applied. In accordance with the intensity of light, the first EC electrolyte layer 47a develops C (cyan). Since the second and third EC display layers 43b and 43c are opened circuit at this time, the color states are maintained.

When writing light is spatially shifted, that is, when writing on another space (the position) is performed, writing light is moved in parallel with the substrate 25, as shown in FIGS. 13 (b), (d), and (f). Thus, writing is performed similarly to the foregoing process. Since the previously written portion is not irradiated with writing light, the photoconductor becomes non-conductive. Therefore, the oxidation and reduction reactions do not occur in each EC electrolyte layer. Thus, the color state realized by previous writing is maintained (memorized).

Figure 12:
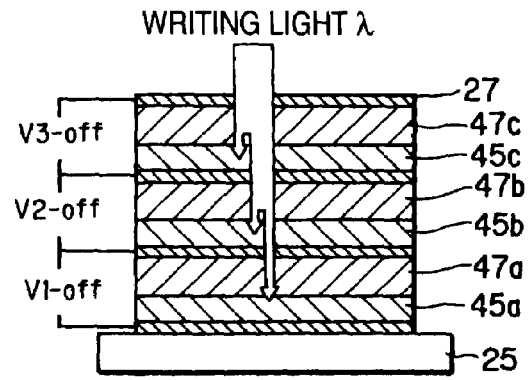
FIG. 12 is a diagram showing an erasing state of the display device shown in FIG. 11.
Figure 13A:
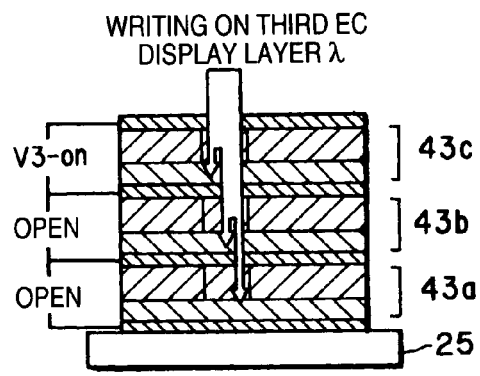
FIG. 13(a), FIG. 13(b), FIG. 13(c), FIG. 13(d), FIG. 13(e) and FIG. 13(f) are diagrams showing writing states of the display device shown in FIG. 11.
Figure 13B:
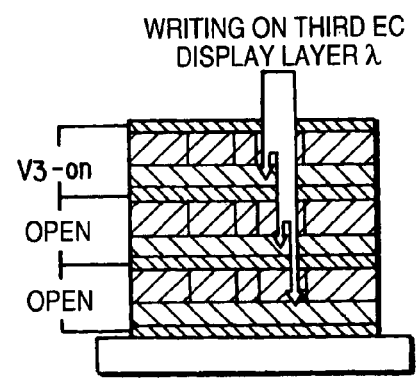
Figure 13C:
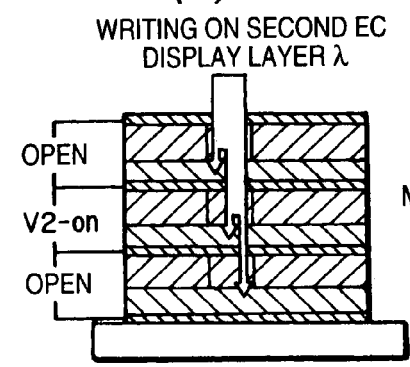
Figure 13D:
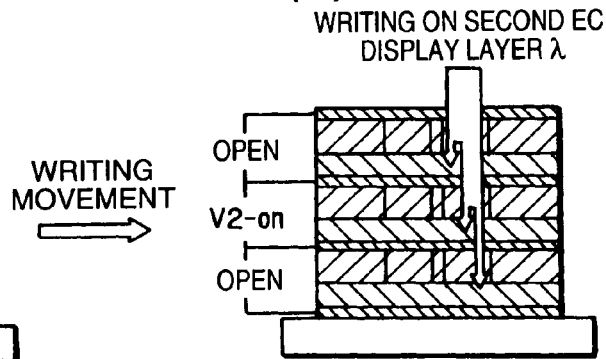
Figure 13E:
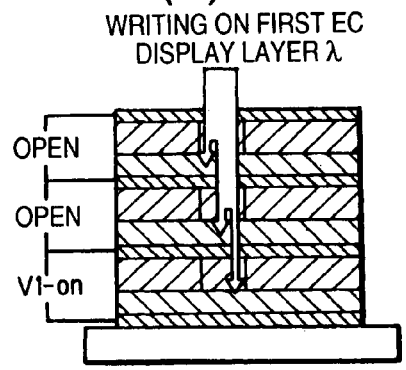
Figure 13F:
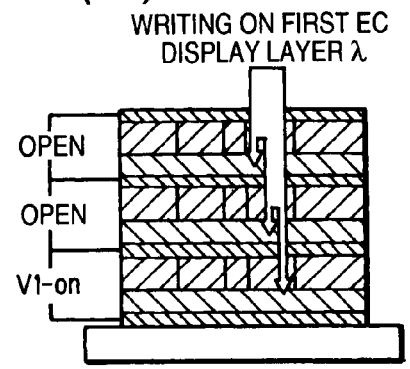

When erasing is performed, a required portion is irradiated with writing light corresponding to the EC display layer, as shown in FIG. 12. Then, voltage for erasing color (realizing transparent) is applied to the power source connected to the foregoing layer.

When voltage for causing an oxidation (reduction) reaction to occur has been applied when color development is performed, voltage for causing a reduction (oxidation) reaction to occur is applied when the color is erased.

Any one of a variety of writing/erasing sequences may be employed. For example, a process may be employed in which the color state is erased from the overall surface of the device, followed by performing writing on an arbitrary space (position). Another process may be employed in which erasing is performed at an arbitrary space (position), followed by performing writing.

In the foregoing case, the image forming means has a structure that the density of color is controlled to correspond to the intensity of light. As an alternative to this, a method may be employed with which light having a predetermined intensity is applied to control the density of the color to correspond to the duration of light application. The density of the color may be controlled in accordance with the power supply voltage. Moreover, the foregoing methods may be combined with one another to control the density of the color.

The wavelength for developing color, the writing wavelength and the number of the EC display layers are not limited to the foregoing writing display example, that is, they may be determined arbitrarily. The structure of the EC display layer is not limited to the foregoing example. For example, the order of lamination may be such that the EC electrolyte layer/the photoconductor from a direction of incidence of light. An order that the photoconductor/the EC electrolyte layer may be employed. In the foregoing example, one writing light beam having a specific wavelength is employed. A plurality of types of writing light beams having different wavelengths and selective application of the voltage may be employed to display each color.

The foregoing writing display example is structured to perform display owing to light transmission. A reflection display method may be employed such that a reflecting layer is provided for either of the devices. Also the direction in which the writing light is applied may arbitrarily be determined. The photowriting display device may incorporate optical filters in the optical path thereof.

Figure 14:
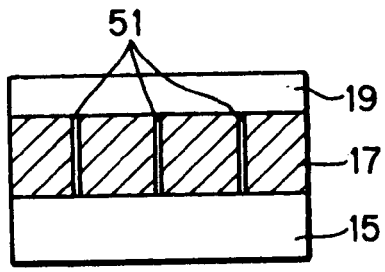
FIG. 14 is a cross sectional view showing an EC display member provided with a separator.

In an example case of an EC display member structured such that the surface of the substrate is irradiated with writing light and the opposite surface of the substrate is made to be the display surface, it is preferable that an optical filter is provided for a position adjacent to the display surface when writing light is UV or IR. The foregoing optical filter is transparent with respect to a visible ray and the filter intercept UV or IR. As a result, an error in the writing operation owing to disturbance UV ray or IR ray can be prevented. Moreover, unnecessary emission of writing light toward the display surface can be prevented. As shown in FIG. 14, each of the EC layers may be provided with a separator (an insulating wall) 51 for partitioning the small space into cells. The separator 51 may be provided for the EC layer and/or the electrolyte layer. The separator 51 is able to prevent dispersion of the EC reactions (the oxidation and reduction reactions) in the lateral direction (in a direction in parallel with the surface of lamination). As a result, transmission of the oxidation and reduction reactions from the region irradiated with light to the region which is not irradiated with light can reliably be prevented. As a result, a clear boundary of the color developing/erasing reaction can be obtained, causing a furthermore sharp image to be obtained.

A structure (not shown) may be employed in which the separator 51 is provided for the photoconductor in order to prevent dispersion of the photo-carriers in the lateral direction.

A structure (not shown) may be employed in which the separator 51 is provided for each of the photoconductors, the EC layers and/or the electrolyte layers.

Figure 15:
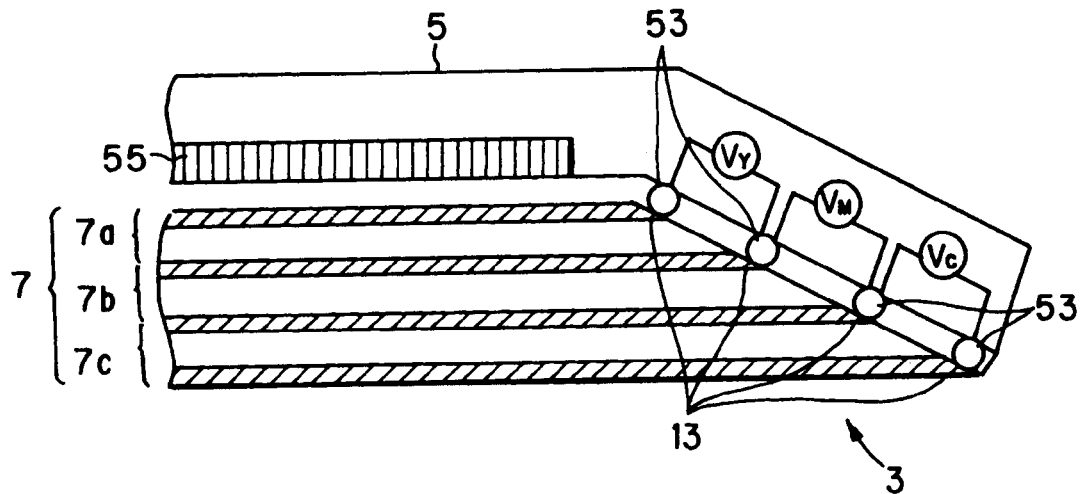
FIG. 15 is a cross sectional view showing a contact structure between the writing display plate and a writing head.

The writing display plate 3 of the photowriting display apparatus 1 according to this embodiment has a structure as shown in FIG. 15 that the electrodes 13 of each of the EC display members 7a, 7b and 7c in each layer formed into an inclined surface at an end of the writing display plate 3 is exposed to the outside. The sliding contact 53 provided for the writing head 5 is brought into contact with the exposed electrodes 13. The writing head 5 has light emitting portions 55 disposed in a line opposite to the writing display plate 3. The writing head 5 is moved in parallel with the writing display plate 3 in a direction perpendicular (in a direction indicated with an arrow shown in FIG. 1) to the direction in which the light emitting portions 55 are disposed in the line.

The writing head 5 is connected to each of the EC display members 7a, 7b and 7c in each layer of the writing display plate 3 through the sliding contact 53. As a result, the voltage can selectively be applied to the EC display members 7a, 7b and 7c in a required layer in response to writing light 11. When the structure for exposing the electrodes are exposed to the outside is employed, a contact area of each electrode can be enlarged. As a result, stable conduction of the two elements can be realized.

Figure 16:
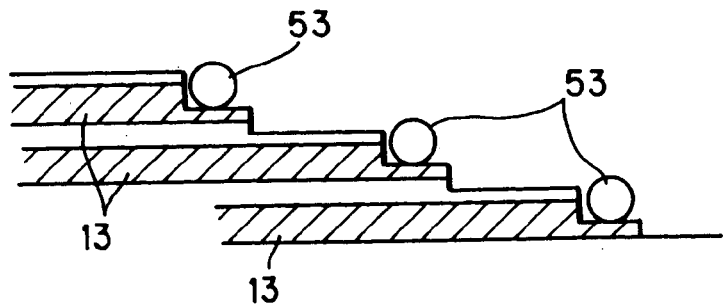
FIG. 16 is a cross sectional view showing a modification of the contact structure shown in FIG. 15.

As an alternative to the inclined surface shown in FIG. 15 for extracting the electrode of the writing display plate 3, a structure as shown in FIG. 16 may be employed. That is, the end of the writing display plate 3 is formed into a stepped shape so that the electrode is exposed at each stepped portion. In the foregoing case, an amount of allowable deviation in the relative position between the writing display plate 3 and the writing head 5 can be enlarged. As a result, the assembling process can be facilitated.

The above-mentioned photowriting display apparatus 1 has the structure that the direction in which the light emitting portions 55 are disposed is the main scanning direction and the direction in which the writing head 5 is moved is the sub-scanning direction. The writing head 5 is irradiated with writing light 11 emitted from the light emitting portions 55 so that scanning is performed. In only the region of the writing display plate 3 irradiated with writing light 11, electrons are supplied or received from the photoconductor layer 15 to the EC layer 17. Moreover, doping or undoping of ions is performed with respect to the electrolyte layer 19 to the EC layer 17 so that oxidation and reduction reactions are performed. As a result, color developing/erasing reactions are performed at the required image.

As described above, the voltage is applied to the EC display members 7a, 7b and 7c in a required layer and writing light 11 is applied. Thus, in only the region in a required layer irradiated with writing light 11, oxidation and reduction reactions can be caused to take place. As a result, an image in full color can be displayed in a specific portion of the writing display plate 3 in accordance with image information.

Since display of an image can be performed when writing light 11 is applied, the necessity for forming the opposite electrodes into a matrix configuration can be eliminated. As a result, only a simple voltage applying circuit is required to cause color developing/erasing reactions to take place.

Since the developed color is clearer than that developed on the display unit, such as a liquid crystal panel, an image exhibiting excellent quality can be displayed.

The writing head 5 may incorporate light receiving portions (not shown) for reading light such that the light receiving portions are disposed at positions adjacent to the light emitting surface of the writing display plate 3. In this case, the light receiving portions are disposed in a line in the same direction as the direction in which the light emitting portions 55 are disposed. As a result of the foregoing structure, the image displayed on the writing display plate 3 is read by moving the light receiving portions. Then, image information can be converted into an analog signal or digital signal which is transmitted to the outside portion of the apparatus. Thus, the photowriting display apparatus 1 is connected to, for example, a computer so that a required image is displayed on the photowriting display apparatus 1 by the computer. Then, additional information is added to the image on the photowriting display apparatus 1. The image added with additional information can again be returned to the computer. As described above, the photowriting display apparatus 1 is able to serve as an advantageous input/output device which is a man-machine interface.

A second embodiment of the photowriting display apparatus according to the present invention will now be described.

Figure 17:
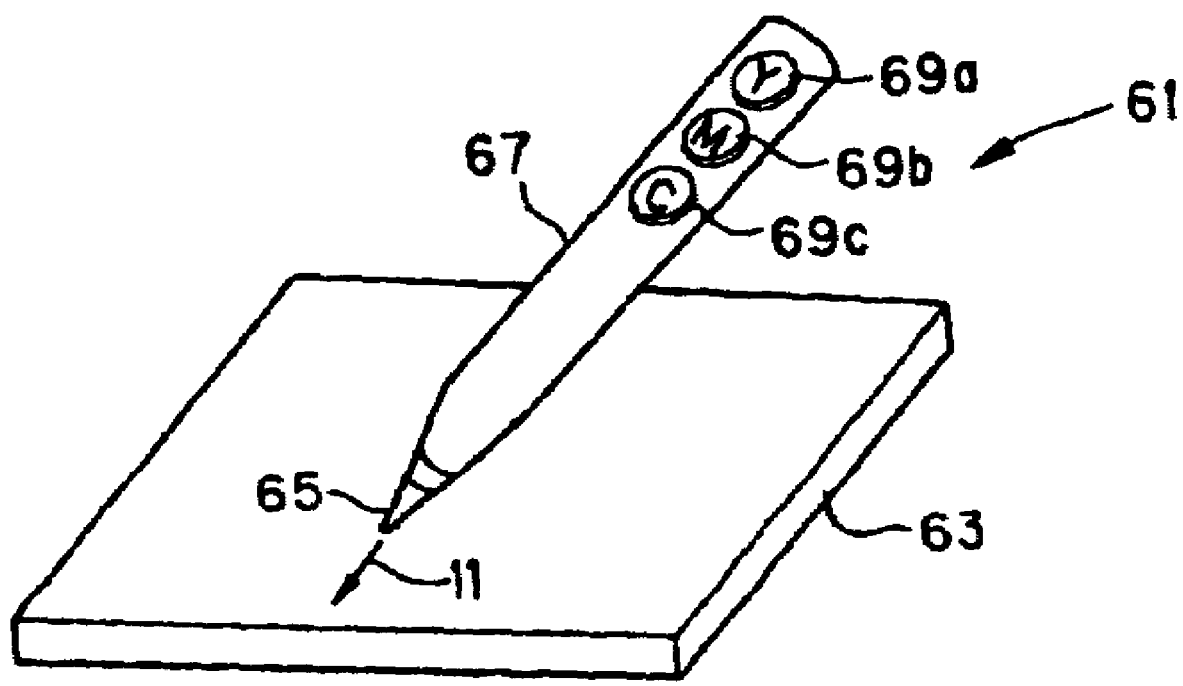
FIG. 17 is a schematic view showing a photowriting display apparatus according to a second embodiment of the present invention.
Figure 18:
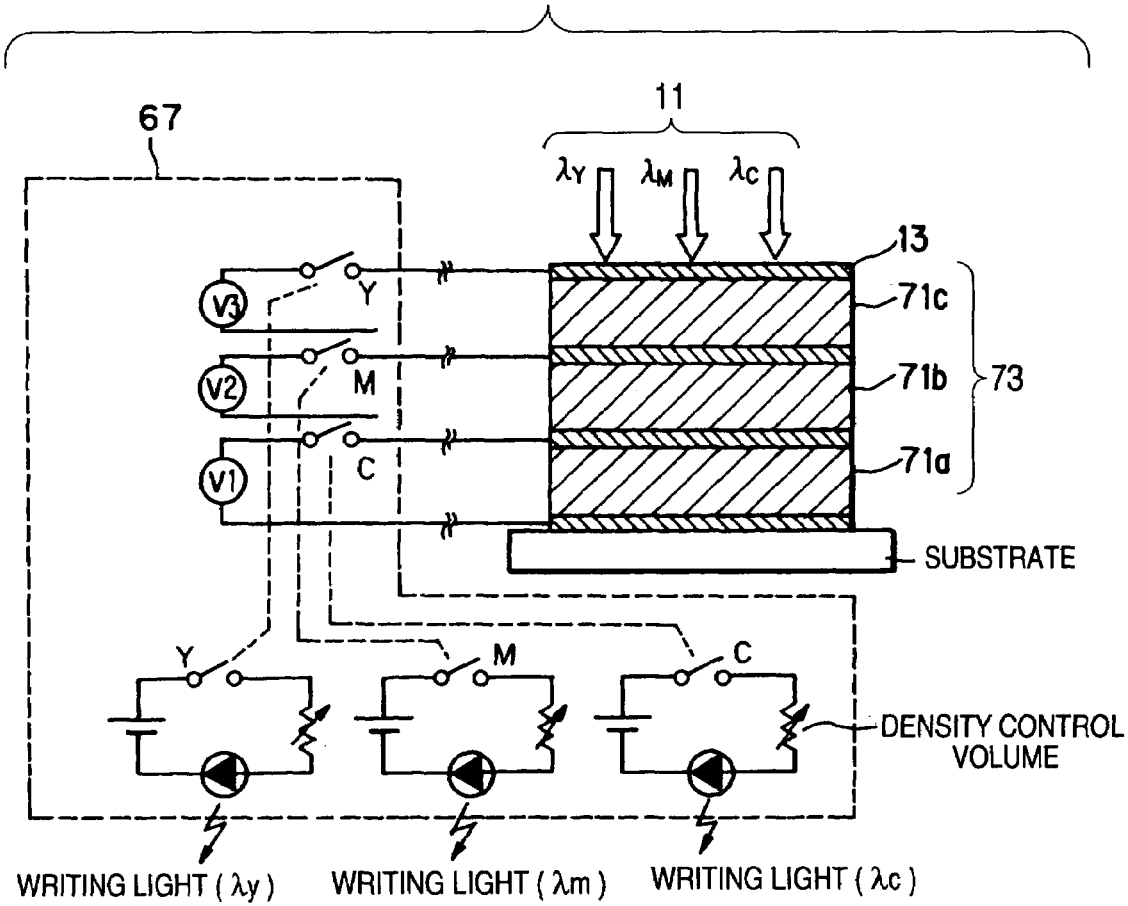
FIG. 18 is a diagram showing a photowriting display apparatus incorporating a writing pen which emits three wavelengths of light.
Figure 19:
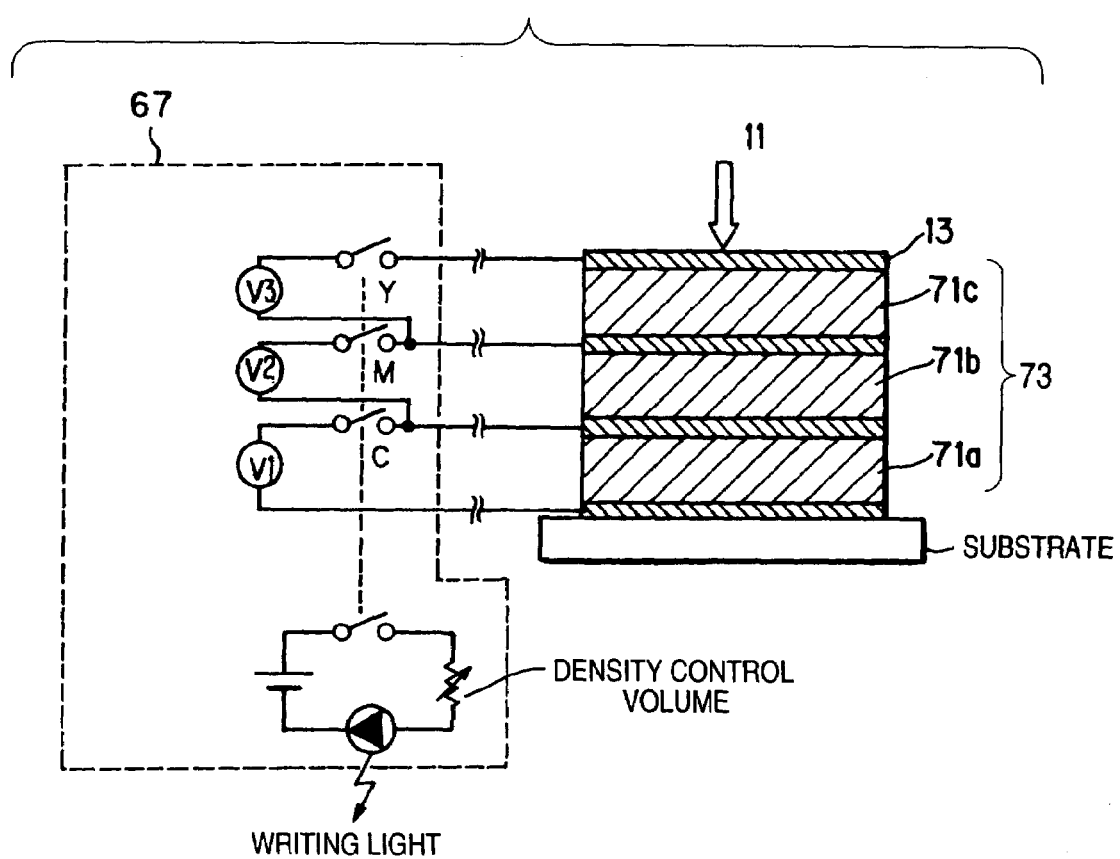
FIG. 19 is a diagram showing a photowriting display apparatus incorporating a writing pen for emitting light having a single wavelength.
Figure 20:
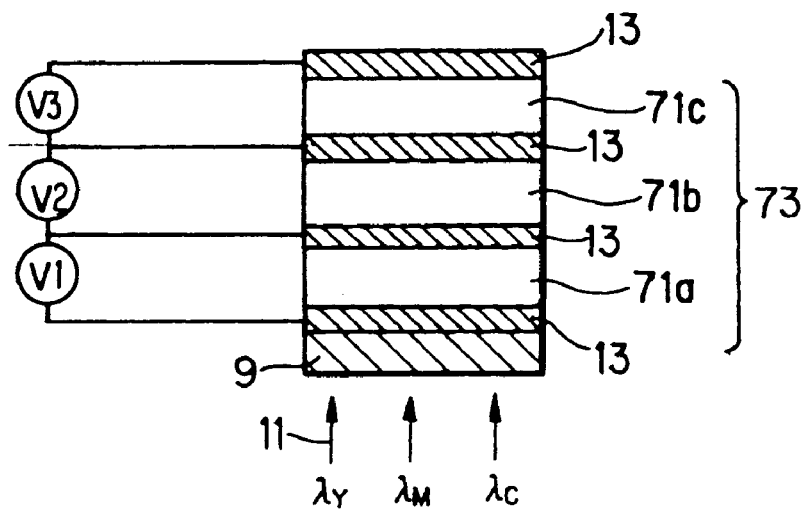
FIG. 20 is a cross sectional view showing the writing display plate shown in FIGS. 17 to 19.
Figure 21:
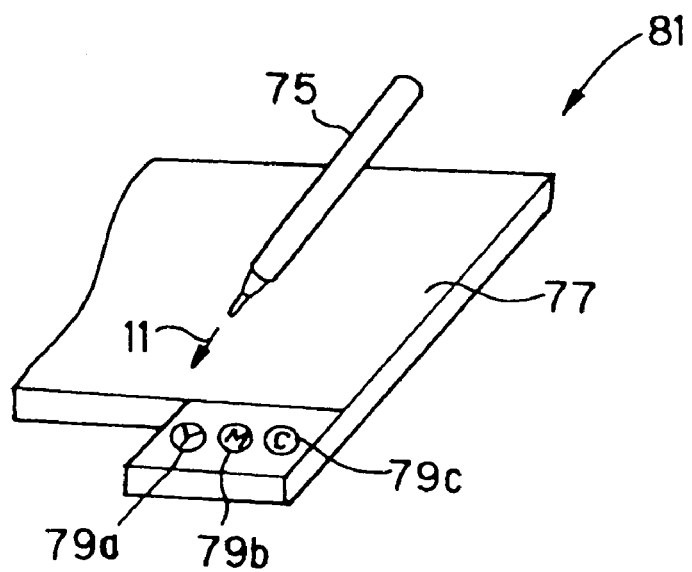
FIG. 21 is a schematic view showing a modification of the photowriting display apparatus shown in FIG. 17.

FIG. 17 is a conceptual view showing the photowriting display device according to the second embodiment of the present invention. FIG. 18 is a diagram showing the photowriting display device incorporating a writing pen which emits light beams having three wavelengths. FIG. 19 is a diagram showing the structure of the photowriting display device incorporating a writing pen which emits a light beam having a single wavelength. FIG. 20 is a cross sectional view showing the writing display plate shown in FIGS. 17 to 19. FIG. 21 is a conceptual view showing a modification of the photowriting display apparatus shown in FIG. 17. The same elements according to the foregoing embodiment are given the same reference numerals and similar elements are omitted from description.

As shown in FIG. 17, a photowriting display apparatus 61 according to this embodiment incorporates a writing display plate 63 and a pen 67 having, at a leading end thereof, a light emitting portion 65 for emitting writing light 11. The pen 67 is provided with selection buttons 69a, 69b and 69c for selecting an arbitrary color selected from a plurality of colors. When the selection buttons 69a, 69b and 69c are selectively operated, writing light 11 having a predetermined wavelength can be emitted. The pen 67 according to this embodiment is able to emit writing light 11 in, for example, yellow (Y), magenta (M) and cyan (C) which are three primary colors. As an alternative to this, another structure may be employed in which a plurality of selection buttons corresponding to arbitrary colors are provided to enable the color corresponding to selection using selection button to be developed by the photowriting display apparatus 61. To achieve this, the pen 67 is used to simultaneously emit light of each primary color at an arbitrary ratio.

A photowriting display apparatus structured as shown in FIG. 18 may be employed. The photowriting display apparatus incorporates a pen accommodating three power sources V1, V2 and V3 corresponding to the EC display members. Moreover, light sources, for example, LEDs or LDs (semiconductor lasers) for emitting wavelengths λY, λM and λc are provided. Moreover, a resistance volume for changing the quantity of light of the light source is provided. Moreover, selection buttons (switches) for selecting YMC are provided, the switches being arranged to be operated in synchronization with opening/closing between the power source and the light source. Each power source is connected to each electrode of the display member through the switch. Since the pen has the above-mentioned structure, the power source corresponding to the color selected by the selection button is connected to the corresponding EC display member. Simultaneously, light of the light source corresponding to the foregoing color is emitted from the point of the pen. As a result of the above-mentioned operation, the EC display member in the selected color is color-developed at the emitted position.

As an alternative to the foregoing structure, a variety of structures of the circuit may be employed. For example, a structure may be employed in which the power source is provided for a position adjacent to the display member as a substitute for the structure in which the power source is disposed in the pen. The overall structure may be controlled by a microprocessor. A power source may be provided for the display member to realize synchronization with the light source through a wireless method, such as an infrared ray, so that the synchronization is controlled. In addition to the color developing function, an erasing function and the like may be imparted.

FIG. 19 shows the structure of a pen arranged to use a single writing light beam and selecting voltage. Thus, YMC selection buttons are operated to connect the power source corresponding to each color to the electrode of each EC display member. Simultaneously, light is emitted from the light source so that the EC display member connected to the power source is color-developed.

As shown in FIG. 20, the writing display plate 63 incorporates EC display members 71a, 71b and 71c laminated to develop different colors (Y, M and C) and disposed between a pair of electrodes 13. Each of the EC display members 71a, 71b and 71c incorporates the foregoing photoconductor layer 15, the EC layer 17 and the electrolyte layer 19. The lower surface of the lower electrodes 13 is provided with the reflecting film 9, similarly to the foregoing structure.

In the structure shown in FIG. 18, the photowriting display devices 73 formed by laminating the plural EC display members 71a, 71b and 71c are simultaneously applied with voltage. On the other hand, writing light 11 having the wavelength selected by the selection buttons 69a, 69b and 69c of the pen 67 shown in FIG. 17 is emitted. Therefore, the pen 67 is moved to correspond to the required image so that oxidation and reduction reactions of the EC display members 71a, 71b and 71c in the predetermined layer corresponding to the wavelength take place. As a result, a full color image can be formed.

In the structure shown in FIG. 19, the EC display layer of the photowriting display device 73 formed by laminating the plural EC display members 71a, 71b and 71c selected by the selection buttons 69a, 69b and 69c of the pen 67 shown in FIG. 17 is applied with voltage. Moreover, writing light having a predetermined wavelength is emitted from the light source. Therefore, the pen 67 is moved to correspond to the required image. Thus, oxidation and reduction reactions of the EC display members 71a, 71b and 71c of the layer selected by the selection button take place so that a full color image is formed.

As described above, the photowriting display apparatus 61 according to this embodiment is structured such that required writing light 11 is emitted from the pen 67. Thus, oxidation and reduction reactions of only the region of the required EC display members 71a, 71b and 71c irradiated with writing light 11 take place. Therefore, an image in a required color can be displayed on the writing display plate 63 in accordance with image information.

Since the pen 67 incorporating the light emitting portion 65 at the leading end thereof is employed, the movement operation using the pen can directly be input as information to be displayed. Therefore, input can easily be performed.

In the foregoing embodiment, the selection buttons 69a, 69b and 69c are provided for the pen 67. Moreover, writing light 11 which is emitted from the pen 67 can be selected. As an alternative to this, a structure as shown in FIG. 21 may be employed in which a pen 75 for emitting writing light 11 having a single wavelength is used. Moreover, selection buttons 79a, 79b and 79c for selectively applying voltage to the corresponding EC display members 71a, 71b and 71c may be provided for the writing display plate 77. The photowriting display apparatus 81 according to this modification is structured to use the pen 75 for emitting writing light 11 in a monocolor so that the selection buttons 79a, 79b and 79c are arbitrary operated. Thus, a required color can selectively be displayed.

Each of the photowriting display apparatuses 61 and 81 may be provided with the writing head 5 according to the first embodiment. As a result of the foregoing structure, an image displayed by the writing head 5 may be modified by using the pen 67 or 75. Moreover, the modified image can be read through a light receiving portion (not shown).

The image can be erased by arbitrarily applying voltage with which the erasing reaction takes place to apply writing light 11 from the light emitting portion.

In each of the foregoing embodiments, the structure is formed such that control is performed by applying voltage. As a matter of course, a structure may be employed in which control is performed by supplying an electric current. When the control is performed by supplying the electric current, for example, duration in which the electric current is supplied is changed to accurately control the amount of charge applied from the power source. Therefore, the density of color of the device can easily be controlled. As a result, a characteristic can be realized with which an influence of the environment or the like cannot easily be exerted.

As described above, the photowriting display device according to the present invention incorporates a pair of electrodes between which the photoconductive layer which is made to be conductive when the photoconductive layer is irradiated with writing light and the electrochromic layer having the region in which the light absorption is reversibly changed owing to electrochemical oxidation and reduction reactions caused from the conductivity are sandwiched so that electrochromic display members are structured. Therefore, when voltage or electric current is exerted to the space between the electrodes and writing light is applied, only the region irradiated with writing light can be changed owing to the oxidation and reduction reactions. Since the plural electrochromic display members for developing different colors are laminated, color developing/erasing reactions of the specific portion of the display surface of each layer in accordance with image information enables bright full color display to be performed as compared with a photowriting display device having a single-layer structure or a structure incorporating color filters.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A photowriting display device comprising:
   a plurality of electrochromic display members, each including:
   a photoconductor in which only regions irradiated with writing light generate carriers to create conductivity;
   an electrochromic layer in which light absorption at said regions is reversibly changed owing to electrochemical oxidation and reduction reactions caused to occur due to the conductivity;
   an electrolyte on which said electrochromic layer is laminated or in which material of said electrochromic layer is dissolved; and
   a pair of electrodes laminating said photoconductor, said electrochromic layer, and said electrolyte, in between,
   wherein said electrochromic display members are developed into different colors, and
   further wherein said electrochromic display members in corresponding layers have different photosensitive wavelengths for writing from one another, and writing on said electrochromic display member in an arbitrary layer is performed by selectively irradiating writing lights each emitting one of said different wavelengths.

2. A photowriting display device comprising:
   a plurality of electrochromic display members, each including:
   a photoconductor in which only regions irradiated with writing light generate carriers to create conductivity;
   an electrochromic layer in which light absorption at said regions is reversibly changed owing to electrochemical oxidation and reduction reactions caused to occur due to the conductivity;
   an electrolyte on which said electrochromic layer is laminated or in which material of said electrochromic layer is dissolved; and
   a pair of electrodes laminating said photoconductor, said electrochromic layer, and said electrolyte, in between,
   wherein said electrochromic display members are developed into different colors, and
   further wherein said electrochromic display members which are developed into different colors are shifted in a direction of the surface of lamination to expose each of said electrodes of said electrochromic display members respectively at an end of said writing display plate,
   a writing head which incorporates at least one light emitting portion so as to emit writing light, and
   a sliding contact, which is arranged to make electrical contact with each of said exposed electrodes respectively, is provided for said writing head.

3. A photowriting display device comprising:
   a plurality of electrochromic display members, each including:
   a photoconductor in which only regions irradiated with writing light generate carriers to create conductivity;
   an electrochromic layer in which light absorption at said regions is reversibly changed owing to electrochemical oxidation and reduction reactions caused to occur due to the conductivity;
   an electrolyte on which said electrochromic layer is laminated or in which material of said electrochromic layer is dissolved; and
   a pair of electrodes laminating said photoconductor, said electrochromic layer, and said electrolyte, in between,
   wherein said electrochromic display members are developed into different colors; and
   wherein writing on said electrochromic display members in an arbitrary layer is performed in such a way that said electrochromic display member in each layer is selectively applied with voltage or an electric current and simultaneously projected with a writing light which emits light at a predetermined unique wavelength specific to each layer.

4. A photowriting display device according to claims 1 or 2 or 3, wherein a separator for preventing diffusion of the carrier and/or the oxidation and reduction reactions in a direction in parallel with the surface of laminate is provided for at least any one of said photoconductor, said electrochromic layer and said electrolyte.

5. A photowriting display device according to claims 1 or 2, wherein writing on said electrochromic display members in an arbitrary layer is performed in such a way that said electrochromic display member in each layer is selectively applied with voltage or an electric current and simultaneously projected with a writing light.

6. A photowriting display device according to claims 1 or 2 or 3, wherein said electrochromic display members are changed between transparent and color states with respect to a visible-ray region.

7. A photowriting display device according to claims 1 or 2 or 3, wherein the wavelength of writing light is deviated from a visible ray region.

8. A photowriting display device according to claims 1 or 2 or 3, further comprising:
   an electrochromic display member which is changed between a transparent state in a visible ray region and a yellow state,
   an electrochromic display member which is changed between a transparent state in a visible ray region and a magenta state, and
   an electrochromic display member which is changed between a transparent state in a visible ray region and a cyan state, wherein said electrochromic display members are laminated.

9. A photowriting display apparatus incorporating a photowriting display device according to claims 1 or 2 or 3, comprising:
   a writing display plate provided with said photowriting display device; and a light pen incorporating a light emitting portion arranged to emit a writing light and disposed at a leading end thereof.

10. A photowriting display device according to claims 1 or 2 or 3, wherein a separator for preventing diffusion of the carrier and/or the oxidation and reduction reactions in a direction in parallel with the surface of laminate is provided for said electrolyte.

11. A photowriting display device according to claims 1 or 2 or 3, wherein said plurality of electrochromic display members are laminated on one another so as to be capable of producing a multicolor image.

12. A photowriting display apparatus comprising:
a photowriting display device including an electrochromic display member containing:
a photoconductor in which only regions irradiated with writing light generate carriers to create conductivity;
an electrochromic layer in which light absorption at said regions is reversibly changed owing to electrochemical oxidation and reduction reactions caused to occur due to the conductivity;
an electrolyte on which said electrochromic layer is laminated or in which material of said electrochromic layer is dissolved; and
a pair of electrodes laminating said photoconductor, said electrochromic layer, and said electrolyte, in between,
a writing display plate provided with said photowriting display device; and
a writing head which incorporates a plurality of light emitting portions disposed in a line opposite to said writing display plate so as to emit writing lights, said plural light emitting portions being moved in parallel with said writing display plate in a direction perpendicular to a direction of the disposition of said plural light emitting portions.

* * * * *